May 2, 1967

R. R. MANDY ETAL 3,316,847

WINDSHIELD WASHER SYSTEM

Filed Oct. 29, 1964

INVENTORS
ROBERT R. MANDY
THOMAS E. TRAINOR
THURSTON METCALF

By Rudolph R. Lowell

ATTORNEY

May 2, 1967

R. R. MANDY ETAL 3,316,847

WINDSHIELD WASHER SYSTEM

Filed Oct. 29, 1964

INVENTORS
ROBERT R. MANDY
THOMAS E. TRAINOR
THURSTON METCALF

BY
Rudolph L. Lowell

ATTORNEY

United States Patent Office 3,316,847
Patented May 2, 1967

3,316,847
WINDSHIELD WASHER SYSTEM
Robert R. Mandy, Thomas E. Trainor, and Thurston Metcalf, Detroit, Mich., assignors, by mesne assignments, to The Delman Company, a corporation of Tennessee
Filed Oct. 29, 1964, Ser. No. 407,426
1 Claim. (Cl. 103—87)

The object of this invention is to provide an improved reservoir and pump combination for a vehicle windshield washer system.

Another object of the invention is to provide a reservoir and pump combination wherein the pump is located in a recess in the bottom wall of the reservoir and detachably connected to the reservoir.

A further object of the invention is to seclude and to protect a pump and motor assembly with a reservoir for installation of the assembly and reservoir as a unit within the engine compartment of a vehicle.

A further object of the invention is to provide a pump and motor assembly which has a minimum number of parts that can be assembled and disassembled in a minimum of time and effort and which is readily attached and detached to a reservoir.

An additional object of the invention is to provide a compact and reliable reservoir and pump combination for a windshield washer system which is sturdy in construction and efficient in use.

These and other objects and advantages of this invention will become readily apparent upon reference to the following description and the accompanying drawing, wherein.

Figure 1:
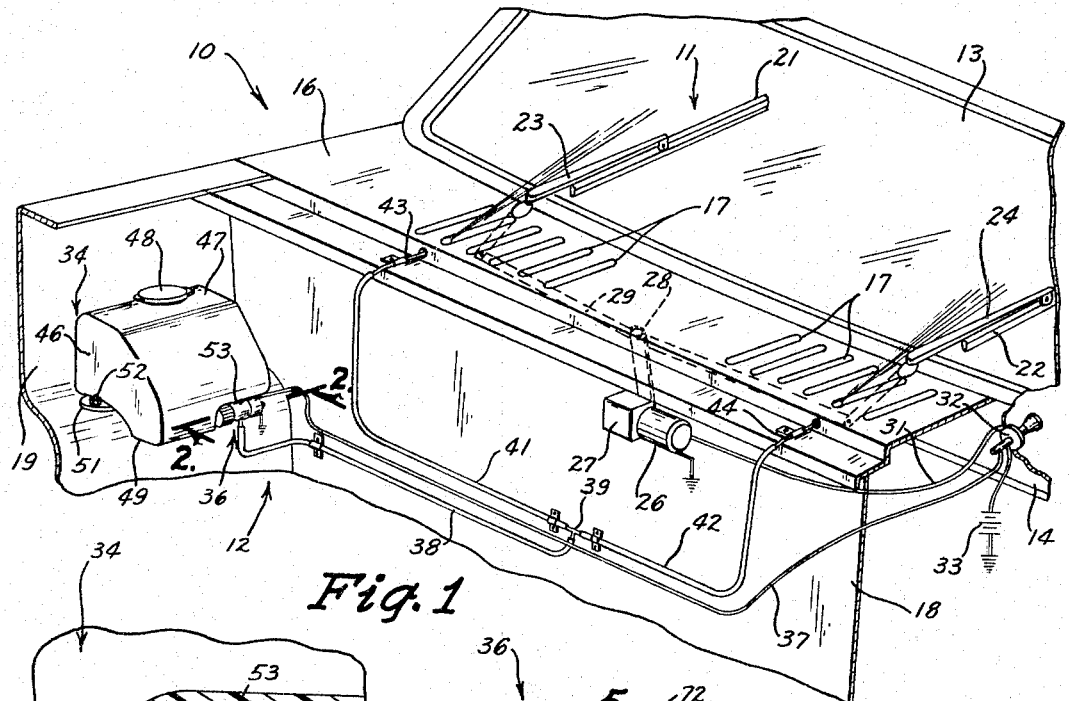
FIG. 1 is a fragmentary perspective view of a motor vehicle equipped with the windshield washer system of this invention.

Referring to the drawing, there is shown in FIG. 1 a motor vehicle, indicated generally at 10, equipped with a wiper unit 11 and a washer unit 12. The vehicle 10 is illustrated in fragmentary form as having an upwardly and rearwardly inclined windshield 13 and a control panel or dashboard 14. Extended forwardly from the lower edge of the windshield 13 is a cowl 16 having a plurality of heater and ventilator openings 17. A firewall 18 projects downwardly from the cowl 16 and separates the passenger compartment from the engine compartment. The opposite ends of the firewall 18 are secured to side walls 19 (one of which is shown) which form part of the front fenders of the vehicle.

The wiper unit 11 comprises a pair of wiper elements 21 and 22 which are in engagement with left and right outside surface portions of the windshield 13. Arms 23 and 24 pivotally connected to the wiper elements 21 and 22 function to support the wiper elements. The wiper elements 21 and 22 together with the arms 23 and 24 are angularly moved by an electric motor 26 having a speed-reduction transmission 27. A crank arm 28 is operatively secured to the power output shaft of the transmission 27 and to linkages 29 operatively connected to the arms 23 and 24.

A line 31 electrically couples the motor 26 to a switch 32 mounted on the dashboard 14. The switch 32 is connected to a battery 33 and is operable to connect and disconnect the battery 33 with the line 31. Thus, when the switch 32 is operated to connect the battery to the line 31 the motor 26 is energized which in turn drives the transmission 27 and the crank arm 28. The motion of the crank arm 28 is transmitted through the linkages 29 to the arms 23 and 24 which carry the wiper elements 21 and 22 in oscillatory paths over the windshield 13 thereby removing foreign material such as water or dirt therefrom.

The washer unit 12 comprises a reservoir, indicated generally at 34, attached to the side wall 19. Positioned below and concealed under the reservoir 34 is a motor and pump assembly, indicated generally at 36, which functions to displace the cleaning liquid stored in the reservoir 34 and discharge this liquid under pressure. A line 37 electrically couples the motor of the assembly 36 to the switch 32 which is operative to connect the line 37 to the battery 33 thereby energizing the motor which in turn drives the pump of the assembly 36. The cleaning liquid discharged by the pump is carried by a hose 38 to a T-coupling 39 which divides the liquid for flow into two hoses 41 and 42. A pair of nozzles 43 and 44 mounted on the step-downed section of the cowl 16 are connected to the discharge ends of the hoses 41 and 42. The discharge end sections of the nozzles 43 and 44 are in alignment with the heater and ventilator openings 17 so as to direct cleaning fluid onto the windshield in the path of movement of the wiper elements 21 and 22.

As shown in FIG. 1, the reservoir 34 is a container of plastic material for storing cleaning liquid and has side walls 46 integral with a top wall 47. A cap 48 closes a fill opening in the top wall 47. The base or bottom wall 49 of the reservoir is of a contour which coincides with the contour of the side wall 19 of the engine compartment. Ears 51 (one of which is shown) project laterally from the bottom wall 49 and have holes for receiving fastening devices 52, such as screws, for securing the reservoir to the side wall 19. The lowermost portion of one corner of the container 34 is formed with a recess 53 for accommodating the entire motor and pump assembly 36 so that the assembly 36 is within the dimensional confines of the reservoir 34.

Figure 2:
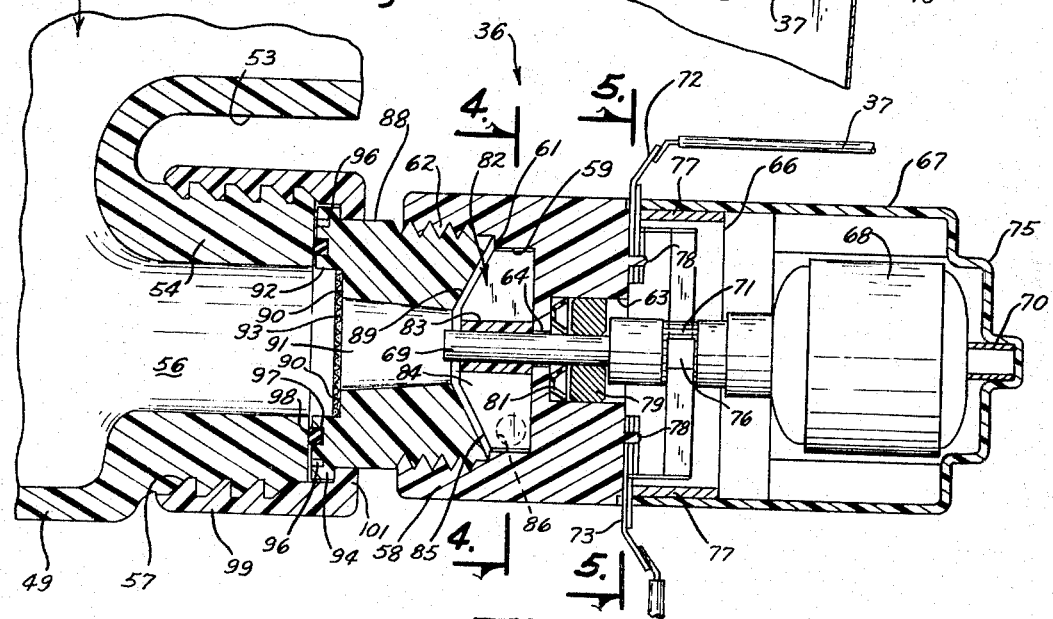
FIG. 2 is an enlarged sectional view of the reservoir and pump and motor assembly taken along the line 2—2 of FIG. 1.

As shown in FIG. 2, the bottom wall 49 of the reservoir 34 has an externally threaded tubular connection 54 which projects into the recess 53. A central passage 56 of the connection 54 opens to the inside of the reservoir.

The motor and pump assembly 36 has a cylindrical body member 58 formed with an axial stepped bore 59 having an annular shoulder 61. The enlarged outer portion 62 of the bore 59 is provided with a helical thread. Axially aligned with the bore 59 is a second bore 63 of a reduced diameter which is connected to the bore 59 through a central opening 64 formed in a wall separating the bores 59 and 63. The end of the body number 58, remote from the bore 59, is integrally formed with an inset tubular sleeve 66 adapted for telescopic reception within a cup shaped housing 67 for an electric motor 68. As best appears in FIG. 2 the housing 67 and body member 58 when relatively assembly form a cylindrical unit of a constant outer diameter.

Figure 5:
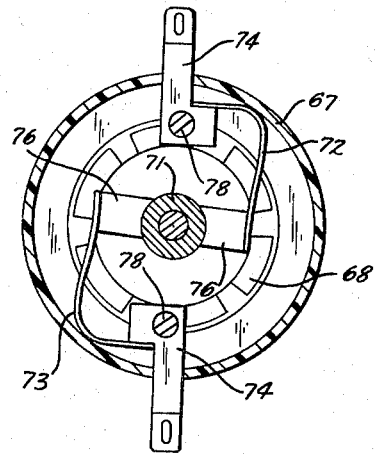
FIG. 5 is an enlarged sectional view taken along the line 5—5 of FIG. 2.

The motor 68 is concentrically arranged within the housing 67 with the outer end of its shaft 69 mounted in a bearing 70 carried in the base wall 75 of the housing 67. On mounting of the housing 67 about the sleeve 66 the opposite end of the motor shaft 69 is projected through the bore 63 and central opening 64 into the bore 59. That portion of the shaft 69, within the sleeve 66, carries a commutator 71 (FIG. 5) operatively associated with brush elements 76 forming part of brush assemblies 72 and 73 having coupling conductors 74. As shown in FIG. 2 the sleeve 66 is slotted at 77 to accommodate the coupling conductors 74, the inner ends of which are anchored about posts 78 extended longitudinally from the body member 58. The outer end of one coupling conductor 74 is connected to the line 37, and the outer end of the other conductor 74 is grounded to the side wall 19 of the engine compartment.

The inner end of the motor shaft 69 (FIG. 2) is supported in a bearing 79 positioned in the bore 63. An annular fluid seal 81, of a V-shape in cross section, is mounted about the shaft 69 at a position between the bearing 79 and the base of the bore 63. Located within the reduced section of the bore 59 is an impeller 82 which is in a driven relation with the shaft 69.

Figure 4:
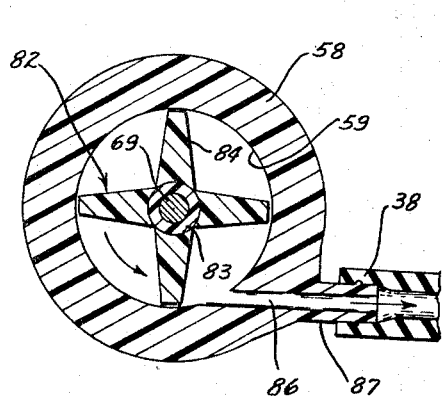
FIG. 4 is an enlarged sectional view taken along the line 4—4 of FIG. 2.

As shown in FIG. 4, the impeller 82 has a central hub 83, mounted on the shaft 69, and four radially projected vanes 84. The opposite sides of the vanes 84 converge toward the free ends of the vanes which terminate adjacent the side wall of the reduced section of the bore 59. The bottom sides 80 of the vanes 84 are flat, lying in a common plane, while the upper sides 85 are inclined downwardly from the hub 83 toward the free ends of the vanes. As a result the width and thickness of a vane 82 increases progressively from its free end toward the central hub 83.

Referring to FIG. 2 there is shown a connector plug 88 having an externally threaded section engageable with the threaded side wall of the enlarged section 62 of the bore 59 to a position wherein the peripheral edge of the end wall 89 of the plug 88 abuts the annular shoulder 61. The end wall 89 is of a concave tapered shape corresponding to the inclination of the top sides 85 of the vanes 84 and is spaced from the vanes 84 of the impeller 82. A longitudinal bore 91 in the plug 88 is of a tapered form with its small end at the end wall 89 and its large end terminating in an annular recess 92 of a diameter greater than the bore 91 to form a shoulder 90. A metal screen 93, such as a brass wire cloth, is positioned in the recess 92 against the shoulder 90 so as to extend over the bore or passage 91. The end of the plug 88, opposite the end wall 89 is formed with a laterally extended annular flange 94, a pair of sockets 96 and an annular groove 97 for an O-ring 98. The sockets 96 accommodate a tool (not shown) used for rotating the plug 88 in its assembly with the body member 58.

A coupling or sleeve 99 has an inwardly projected annular end flange 101 for engaging the flange 94. The sleeve 99 has internal threads which coact with the threads 57 on the reservoir connection 54 to clamp the plug 88 into engagement with the free end of the connection 54. In this position the O-ring functions as a seal to confine the liquid in the reservoir to the passage 56 in the connection 54 and to the passage 91 in the plug 88.

The switch 32, in one position, provides for the operation of only the wiper motor 26, in a second position provides for the concurrent operation of the wiper motor 26 and pump motor 68, and in a third position opens the circuits of the motors 26 and 68.

Figure 3:
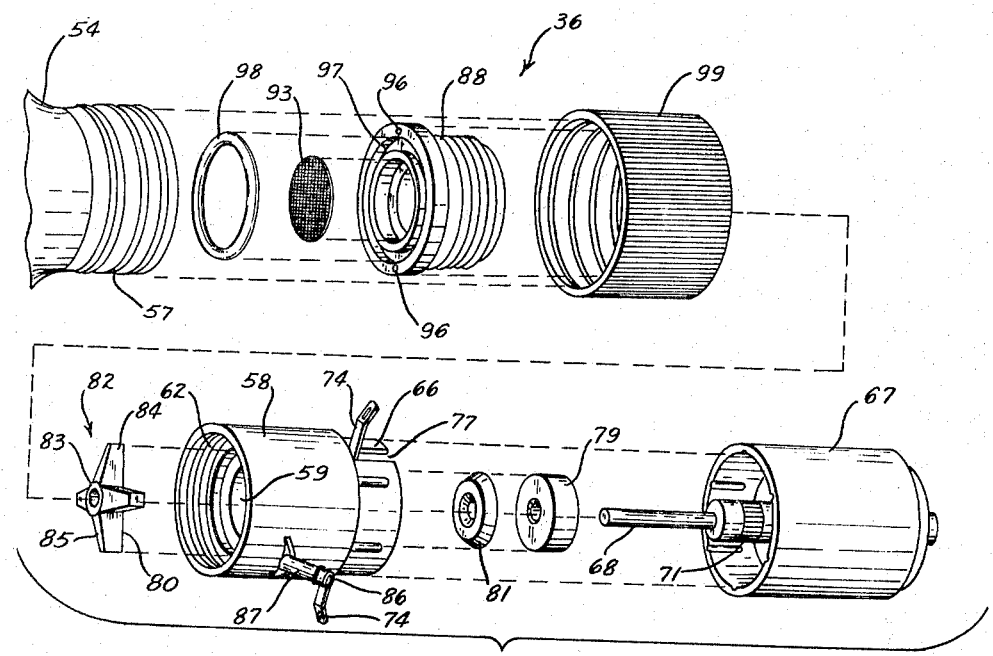
FIG. 3 is an exploded perspective view of the pump and motor assembly of the washer system of FIG. 1.

In the operation of the washer unit 12 the switch 32 is manually moved to its second position to energize the wiper motor 26 and to connect the battery 33 to the line 37 to energize the electric motor 68 to rotate the drive shaft 69. The impeller 82 being secured to the drive shaft 69 is rotated in the direction of the arrow shown in FIG. 4 to move the liquid from the bore 56 and passage 91 through a discharge passage 86 formed in the body member 58 and open to the bore 59. The passage 86 terminates in a connection 87 (FIG. 3) for attachment to the hose 38. Since the connection 54 is located in the bottom of the reservoir 34 the pump is always primed that is, the passage 91 and the bore 59 will contain a supply of liquid until the reservoir is empty.

As shown in FIG. 1, the liquid in the hose 38 travels to the T-coupling 39 and into the hoses 41 and 42, which are connected to the nozzles 43 and 44, for discharge onto the windshield 13. The motor 68 will continue to operate so long as the switch 32 is in its second position connecting the battery 33 to the line 37. Thus to terminate the dispensing of liquid on the windshield 13 the switch 32 is moved to its third position to open the circuits of the motors 26 and 68.

In summary, the windshield washer unit 12 has a pump and motor assembly 36 which is supported on the bottom wall of the reservoir 34 by a coupling 99. The entire pump and motor assembly 36 is located in the recess 53 formed in the bottom wall of the reservoir 34 so as to be within the dimensional confines of the reservoir. The assembly is thus protected against accidental damage by mechanics working in the engine compartment. Also the overall unit of the reservoir 34 and assembly 36 may be installed in the space required only for the reservoir whereby to eliminate the additional space usually required for the assembly 36.

While there have been shown, described and pointed out the fundamental novel features of the invention, it is to be understood that various omissions, substitutions, and changes in form of the combined reservoir and pump illustrated may be made by those skilled in the art without departing from the spirit of the invention which is intended to be limited only by the scope of the appended claim.

We claim:

A pump and motor assembly for a vehicle windshield washer system including a fluid reservoir with a fluid connection adjacent the bottom of and open to the inside of the reservoir, comprising:

(a) a motor unit,
(b) a cylindrical housing means for said motor unit open at one end thereof,
(c) a shaft for said motor unit having an end section projected outwardly from said open end,
(d) a pump unit including a first cylindrical housing member with an axially extended bore, said bore having a central portion of a small diameter, one end portion of a large diameter, and an opposite end portion of an intermediate diameter,
(e) means coupling said first housing member to the open end of said motor housing means with said opposite end portion of the bore open to the inside of said housing means and said shaft end section extended within said bore,
(f) a bearing and fluid seal assembly for said shaft end section located in the opposite end portion of said bore,
(g) an impeller mounted on said shaft end section within said one end portion of the bore,
(h) a second cylindrical housing member for said pump unit having an axially extended bore therein, said second housing member having one end positioned within and in fluid sealing engagement with the side wall of the large diameter portion of said bore, with the end face of said one end of the second housing member positioned adjacent said impeller to form with the inner end of said large diameter bore portion a chamber means for said impeller, said first housing member having an outlet passage open to said chamber means,
(i) means for coupling the opposite end of said second housing member with the connection on said reservoir,
(j) a source of electric energy, and
(k) means connecting said motor with said source of electric energy.

References Cited by the Examiner

UNITED STATES PATENTS

| | | | |
|---|---|---|---|
| 2,381,834 | 8/1945 | Meredew et al. | 103—87 |
| 3,056,911 | 10/1962 | Hart et al. | 239—284 |

FOREIGN PATENTS

| | | |
|---|---|---|
| 468,274 | 12/1951 | Italy. |

ROBERT M. WALKER, *Primary Examiner.*

EVERETT W. KIRBY, *Examiner.*